United States Patent [19]

Hashimoto et al.

[11] Patent Number: 5,740,483
[45] Date of Patent: Apr. 14, 1998

[54] DATA RECORDING DEVICE FOR CAMERA

[75] Inventors: Humio Hashimoto; Nobuhiro Aoki, both of Omiya, Japan

[73] Assignee: Fuji Photo Optical Co., Ltd., Saitama, Japan

[21] Appl. No.: 671,964

[22] Filed: Jun. 28, 1996

[30] Foreign Application Priority Data

Jun. 30, 1995 [JP] Japan ................................. 7-165151

[51] Int. Cl.$^6$ ................................. G03B 17/24
[52] U.S. Cl. ................................. 396/315
[58] Field of Search ................................. 396/310, 315, 396/317, 318

[56] References Cited

U.S. PATENT DOCUMENTS

| 5,270,755 | 12/1993 | Ohno et al. | 354/106 |
| 5,337,108 | 8/1994 | Kaihara et al. | 354/218 |
| 5,389,991 | 2/1995 | Naka et al. | 354/159 |
| 5,532,774 | 7/1996 | Ootsuka | 354/106 |
| 5,532,776 | 7/1996 | Miyamoto et al. | 354/106 |
| 5,600,386 | 2/1997 | Saito et al. | 396/315 |
| 5,617,162 | 4/1997 | Kato et al. | 396/318 |
| 5,630,177 | 5/1997 | Yamada et al. | 396/6 |

*Primary Examiner*—Safet Metjahic
*Assistant Examiner*—Christopher E. Mahoney
*Attorney, Agent, or Firm*—Young & Thompson

[57] ABSTRACT

A data recording device installed into a camera has a light image forming element for forming an image of data to be recorded on a film. It also has an optical system for focusing the data image on the film, with its exit end attached to a data exposure aperture formed in a film guide rail. The guide rail extends in a lengthwise direction on either side of a film exposure aperture at the back of the camera body.

9 Claims, 4 Drawing Sheets

DATA RECORDING DEVICE FOR CAMERA

BACKGROUND OF THE INVENTION

1. Field of the Invention

This invention relates to a data recording device for a camera to record data, such as photographed dates and the like, onto a film.

2. Description of the Related Art

Cameras equipped with a data recording devices for recording data such as a photographed date and the like onto a film have become popular. Such a data recording device includes a light-emitting device built in a camera body which emits an optical data image representing the date of photograph and uses an optical system to project the data image onto a film in the camera. Conventional data recording devices are arranged with the exit end of the optical system being positioned in a corner of the film exposure aperture at the back of the camera body, or after the film exposure aperture as viewed in a direction of film advance, to form an optical data image on the film while supplying the film after every exposure.

The conventional camera data recording device, however, has the exit end of the optical system positioned in a corner of the film exposure aperture or on one side of the film exposure aperture. This arrangement results in that sometimes the distance from the exit end of the optical system to the film fluctuates during film advance, with the problem that an image of the data becomes blurred on the film.

SUMMARY OF THE INVENTION

It is an objective of the invention to provide a data recording device for a camera which always records a sharp image of data.

The data recording device for recording exposure data of this invention is installed in a camera having upper and lower film guide rails extending in a lengthwise direction of film movement on opposite lengthwise sides of a film exposure aperture and comprises light image forming means, such as an array of light emitting diodes, for providing an light image of data, such as a date of photograph and the like, to be recorded on a film located at the film exposure aperture, and an optical system having a light exit end for directing the light image provided from the light exit end to the film from the front and for focusing the light image onto the film. The optical system may comprises prism lenses and is fixed in the camera with the light exit end attached to one end of a bore formed as a data exposure aperture in either one of the upper and lower film guide rails through which the light image travels to the film.

With the data recording device of the invention, when the back cover of the camera is closed, the film loaded in the camera body is interposed between a pressure plate attached to the back cover and the film guide rails disposed along the direction of film transport on opposite lengthwise sides of the film exposure aperture and maintained flat even during the film is transported. The light exit end of the optical system is attached to the data exposure aperture formed in the film margin guide rail, maintaining the distance between the exit end of the optical system and the film surface unchanged with the result of always recording a sharp image of data.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE SPECIFIC EMBODIMENT

Figure 1:
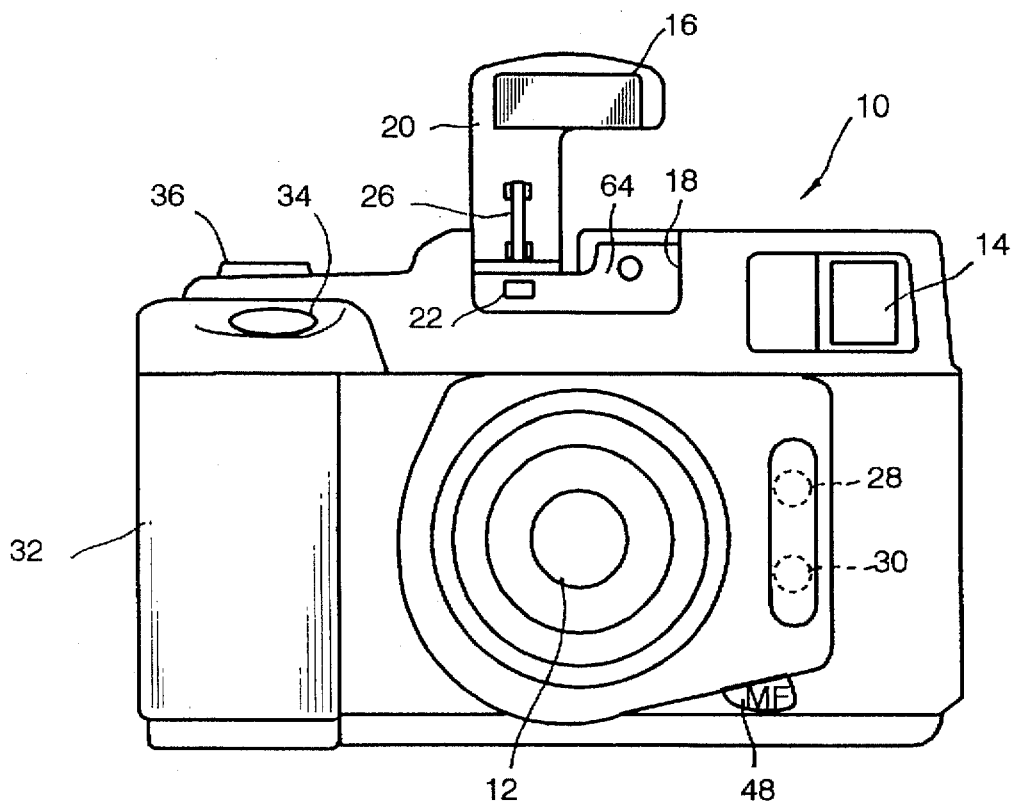
FIG. 1 is a front view of a camera equipped with a data recording device in accordance with an embodiment of the invention.
Figure 2:
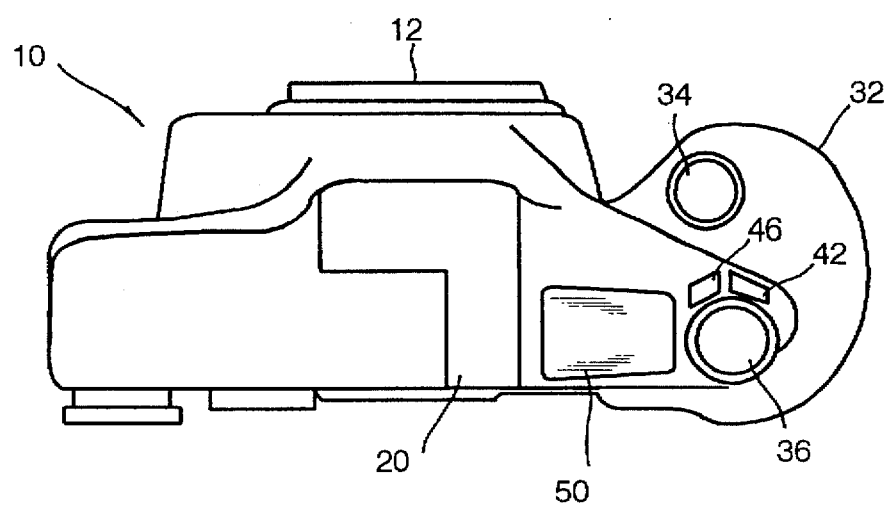
FIG. 2 is a top view of the camera shown in FIG. 1.
Figure 3:
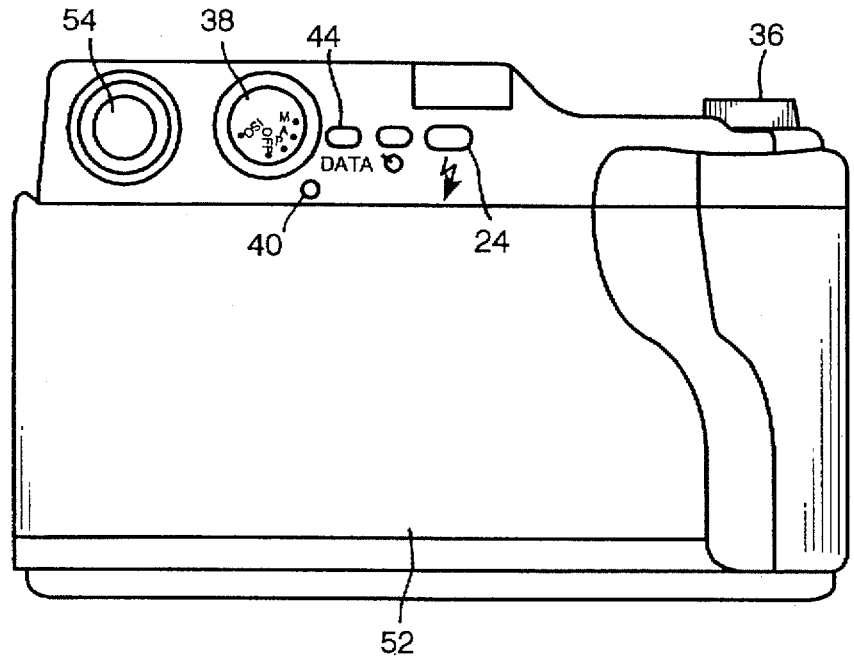
FIG. 3 is a rear view of the camera shown in FIG. 1.

Referring to the drawings in detail, in particular, to FIG. 1 showing a data recording device for a camera according to a preferred embodiment of the invention, a camera shown in FIG. 1 is of a type using a Brownie film and is equipped with an automatic focusing system. The camera is provided with a taking lens 12 positioned in the approximate front center of the camera body 10 and an illuminating window type viewfinder 14 positioned at the top right corner of the camera body 10. The camera is further provided with a pop-up type electronic flash 16 positioned above the taking lens 12 and supported in a flash housing 20 which is mounted for up and down pivotal movement in a depression 18 formed in the top of the camera body 10. The strobe housing 20 is pulled down to receive the electronic flash 16 into the depression 18 and raised to position it above the camera body 10. On the right side of the taking lens 12 as viewed in FIG. 1, a light-emitting unit 28 and a light-receiving unit 30 forming parts of an automatic focusing system are positioned in close proximity to each other. Furthermore, the camera body 10 is formed with a grip 32 at the left side thereof as viewed in FIG. 1 and a shutter button 34 positioned on the top of the grip 32. In addition, as shown in FIG. 2, an up/down dial 36 is positioned adjacent to the shutter button 34. This up/down dial 36 is turned to select a desired value or values in various modes pre-selected by a select dial 38 provided on the back of the camera body 10 as shown in FIG. 3. The select dial 38 is unlocked by depressing a select dial lock button 40 and rotated to select one mode out of various modes "M", "A", "P", "OFF", and "ISO". For example, the up/down dial 36 selects an aperture size and a shutter speed in the "M" mode, and selects an aperture size only in the "A" mode. In addition, after the "P" mode is selected by the select dial 38, an exposure value is varied by operating the up/down dial 36 while depressing an exposure correction button 42 (see FIG. 2), and a date is changed by operating the up/down dial 36 while depressing a "DATA" button 44 (see FIG. 3), Furthermore, the focal length is set by operating the up/down dial 36 while depressing an "MF" button 48 after switching to an "MF" mode by depressing an AF button 46. When the "ISO" mode is selected by the select dial 38, the up/down dial 36 can select an ISO range. Each value in the selected mode is displayed on an liquid crystal display (LCD) panel 50 located adjacent to the select dial 38. The select dial 38 turns off a main power source of the camera at a "OFF" position. Reference numbers 52 and 53 in FIG. 3 designate the back cover of the camera and an eyepiece of the viewfinder 14, respectively.

Figure 5:
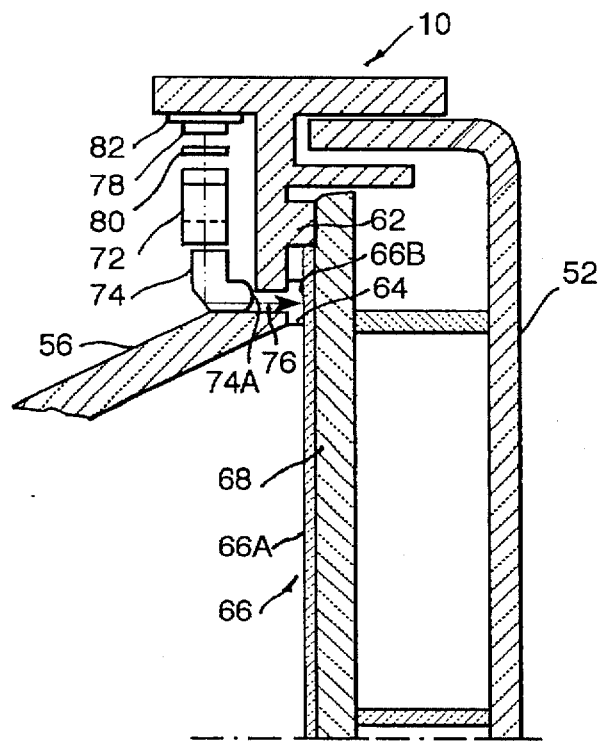
FIG. 5 is a cross-sectional view of the data recording device.
Figure 4:
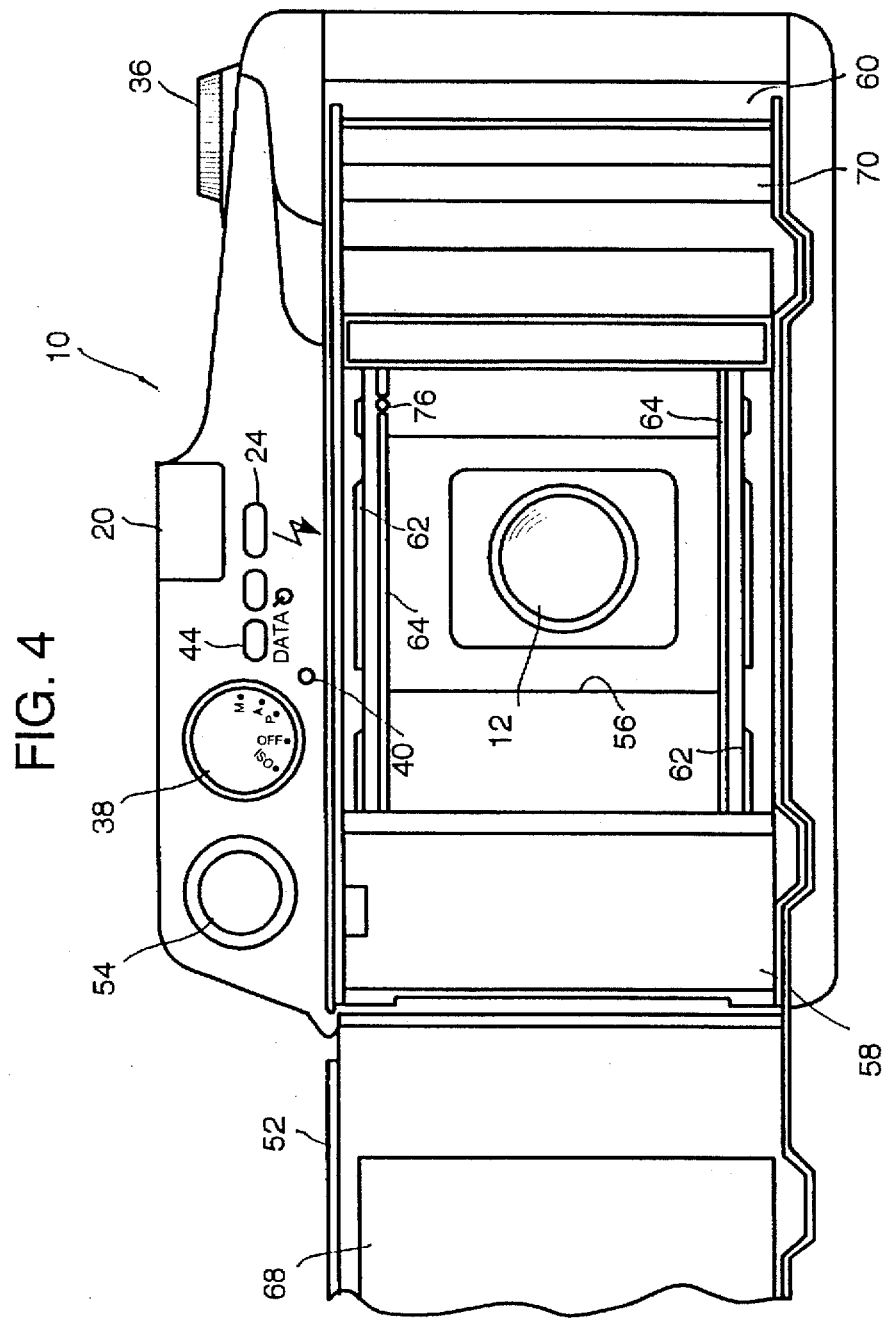
FIG. 4 is a rear view of the camera with a back cover opened.

FIG. 4 shows the camera body 10 with the back cover 52 opened. As shown in FIG. 4, the camera body 10 has a film receiving chamber 58 on one side, for instance on the left side as viewed in FIG. 4, of the film exposure aperture 56 and a film take-up chamber 60 on another side, for instance the right side as viewed in FIG. 4, of the film exposure aperture 56. A photographic film (not shown) loaded in a form of a roll in the film receiving chamber 58 is wound one frame every exposure by means of a film wind mechanism (not shown). During transporting the photographic film, the photographic film is guided by upper and lower edge guide rails 62 and upper and lower margin guide rails 64 extending along a direction in which the photographic film is transported. In addition, as shown in FIG. 5, when the back cover 52 is closed, the photographic film 66 is interposed between the upper and lower margin guide rails 64 and a pressure plate 68 provided the inside of the back cover 52 and is pressed against the pressure plate 68 to maintain the emulsion coated surface 66A of the photographic film 66 flat. The photographic film 66 is exposed in this state through the film exposure aperture 56. As shown in FIG. 4, the photographic film 66 is successively wound around a take-up spool 70 in the film take-up chamber 60 every exposure.

Figure 6:
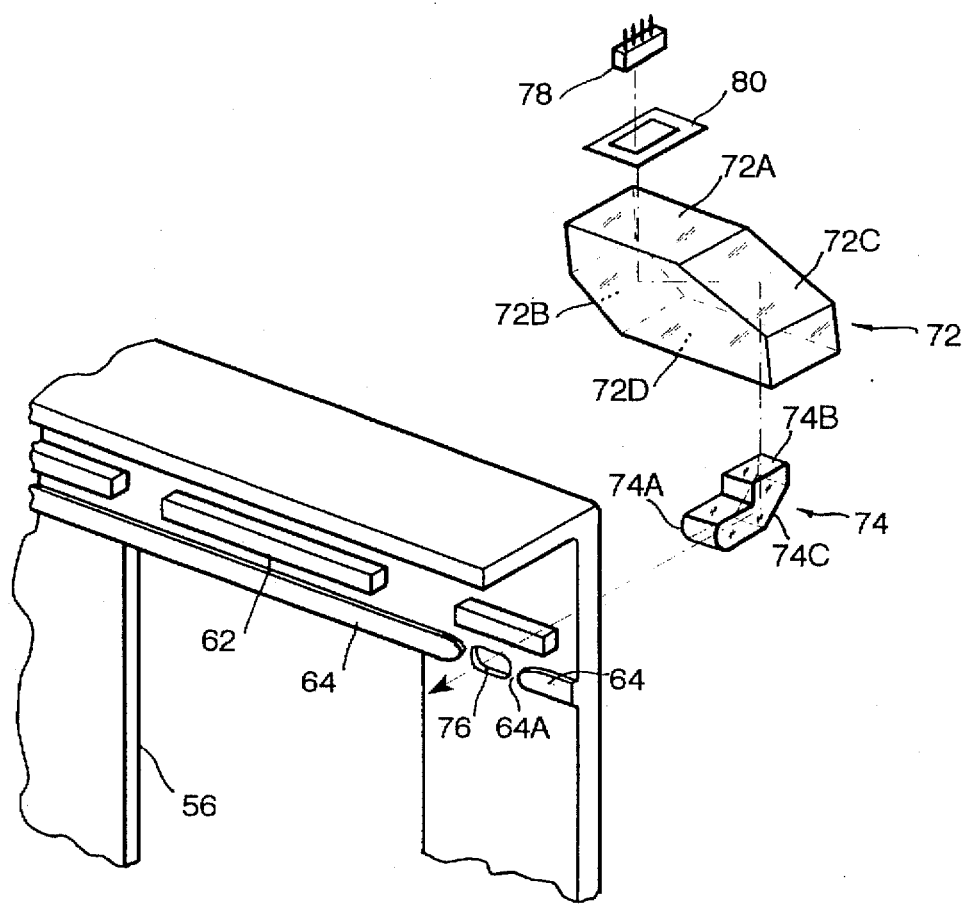
FIG. 6 is a perspective view of the data recording device.

Referring to FIGS. 5 and 6, the data recording optical system includes prism lens 72 and 74 positioned in a vertical direction on behind the top of the film exposure aperture 65 within the camera body 10. An exit end 74A of the prism lens 74 is positioned in contact with an end of a bore 76 formed as a data exposure aperture in a cutout 64A (see FIG. 6) of the upper margin guide rail 64 above the exposure aperture 56 and secured to the bore 76 so that the focal point of the prism lens 74 is on a plane in conformity with the surface of the upper margin guide rail 64. An array of light emitting diodes (LED) 78, which forms a light image of specific data, such as a date or the like, is positioned facing an incident end 72A of the prism lens 72 via an aperture frame 80. The LED array 78, which is formed of a plurality of, for instance seven in this embodiment, light emitting diodes (LED), is bonded to a base plate 82 connected by a flexible printed wiring board (not shown) to a central processing unit (CPU) provided in the camera body 10. These LEDs are turned on and off in combinations by an integrated circuit (not shown) mounted on the base plate 82. With the data recording device thus structured, light of an image of data formed by and emitted from the LED array 78 enters the prism lens 72 through the incident end 72A via the aperture frame 80. This data image light is reflected and turned at 90° to a horizontal direction by a reflective surface 72B of the prism lens 72, and further reflected and turned downward at 90° by a reflective surface 72C of the prism lens 72. The data image light emitting from the prism lens 72 through the exit edge 72D then enters the prism lens 74 through the incident end 74B and is reflected and turned at 90°, by a reflective surface 74C of the lens prism 74, toward the exit end 74A. By means of the data recording optical system, the data image is focused on a data recording 66B of the photographic film 66 as shown in FIG. 5 via the film exposure aperture 76.

In the operation of the data recording device as described above, after opening the back cover 52 and loading a roll of photographic film 66 in the film receiving chamber 58, the leader of the photographic film 66 is pulled out and engaged with the take-up spool 70 in the film take-up chamber 60. Following closing the back cover 52, the photographic film 66 is positioned so that the upper and lower margins are interposed between the pressure plate 68 and the upper and lower margin guide rails 64 as shown in FIG. 5 and, as a result, the data recording surface 66B of the photographic film 66 is maintained flat. When the shutter button 34 is depressed to complete exposure of the first frame of the photographic film 66, the film wind mechanism winds up the photographic film 66 by one frame, guiding it by the upper and lower guide rails 62 and 64. In conjunction with this winding action, the LED array 78 of the data recording device is turned on for a given period of time to provide light rays of an image of data and focuses the data image on the data recording surface 66B of the photographic film 66 through the film exposure aperture 76 in the upper margin guide rail 64 via the prism lenses 72 and 74. By this means, data such as the date of photography or the like is recorded on the photographic film 66. During recording the data, the photographic film 66 is interposed between the upper and lower margin guide rails 64 and the pressure plate 68 to be maintained flat and, the focal point of the optical system comprising the prism lenses 72 and 74 is set to a plane coincident with the surface of the upper margin guide rail 64. Accordingly, with the present embodiment, the distance between the exit end 74A of the lens prism 74 of the optical system and the data transfer surface 66B is always maintained unchanged even during film transport, and consequently, it is always enabled to record a sharp image of data provided by the LED array 78 on the photographic film 66.

Since data is recorded by the data recording device of the invention on a lengthwise margin outside exposure frames of the photographic film 66, a photographic paper having a width larger than the width of the exposure frame of the photographic film 66 is used to make prints including recorded data from the photographic film 66. Although the camera has been described as using a Brownie film, this invention may also be applied to cameras for use with 135 type films.

What is claimed is:

1. A data recording device for recording data on a film in a camera which is provided with upper and lower film guide rails extending in a direction of film movement on opposite sides of a film exposure aperture, said data recording device comprising:

light image forming means for providing a light image of data to be recorded on a film at said film exposure aperture;

an optical system having a light exit end for directing said light image from said light exit end onto an emulsion coated surface of said film; and a data exposure aperture in either one of said upper and lower film guide rails for permitting said light image directed to said film therethrough.

2. A data recording device as defined in claim 1, wherein said light exit end is attached to one end of said aperture.

3. A data recording device as defined in claim 1, wherein said guide rail has a guide surface for guiding a margin of said film.

4. A data recording device as defined in claim 1, wherein said light image forming means comprises an array of light emitting diodes.

5. A data recording device as defined in claim 1, wherein said optical system comprises a prism formed integrally with a lens at said light exit end.

6. A method of projecting data onto film in a camera having guide rails for holding the film, the method comprising the steps of forming a light image of data to be projected onto the film, and projecting the light image of data through a data exposure aperture in one of the guide rails and onto the film.

7. The method of claim 6 wherein the step of forming the light image of data comprises the step of providing the light image of data with an array of light emitting diodes, and the step of projecting the light image of data comprises the step of directing the light image of data from the array into a prism and through the data exposure aperture.

8. A camera comprising:

guide rails for holding film in the camera;

a data exposure aperture in one of said guide rails; and a projector for projecting a light image of data which is to be recorded on the film through said data exposure aperture onto the film.

9. The camera of claim 8 wherein said projector comprises an array of light emitting diodes for forming the light image of data, and a prism for directing the light image of data from said array through said data exposure aperture.

* * * * *

UNITED STATES PATENT AND TRADEMARK OFFICE
CERTIFICATE OF CORRECTION

PATENT NO. : 5,740,483  
DATED : April 14, 1998  
INVENTOR(S) : Shiro Hashimoto et al.

Page 1 of 1

It is certified that error appears in the above-identified patent and that said Letters Patent is hereby corrected as shown below:

<u>Title page,</u>
Item [75], change the first name of the first inventor from "Humio" to -- Shiro --.

Signed and Sealed this

Nineteenth Day of February, 2002

Attest:

JAMES E. ROGAN
*Attesting Officer*   *Director of the United States Patent and Trademark Office*